Sept. 7, 1954
H. JENSEN
2,688,456
STABILIZING SYSTEM
Filed Aug. 16, 1949
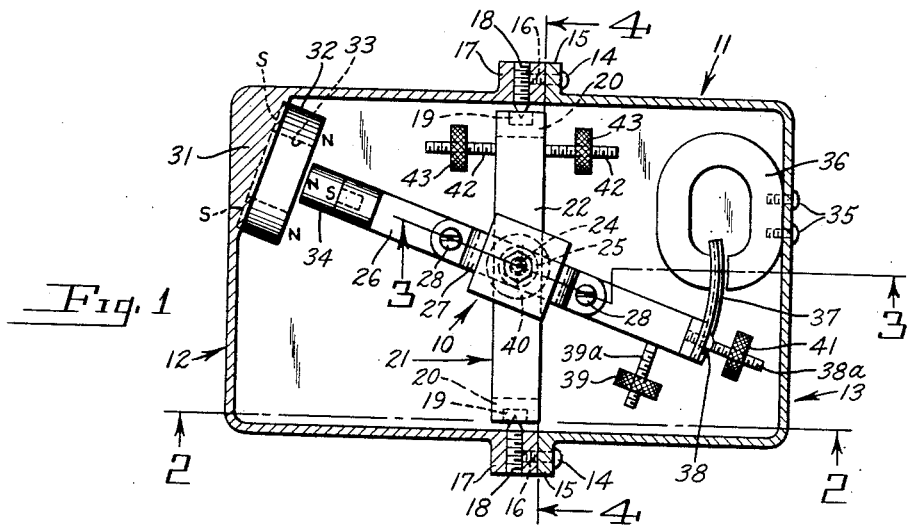
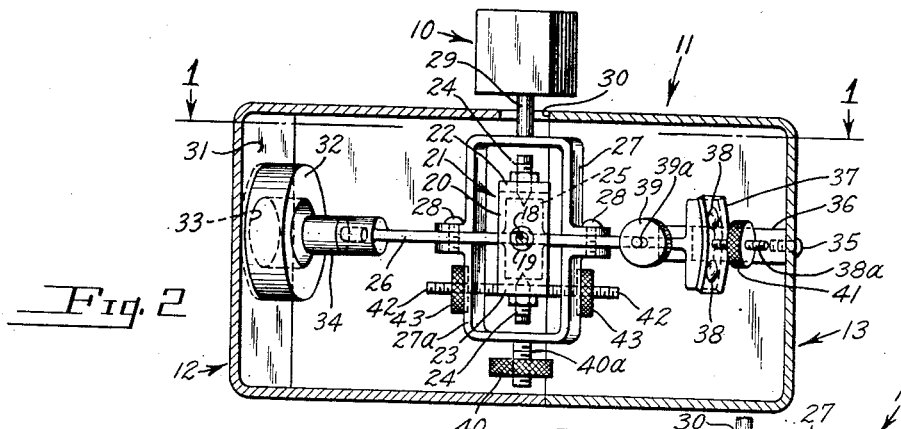
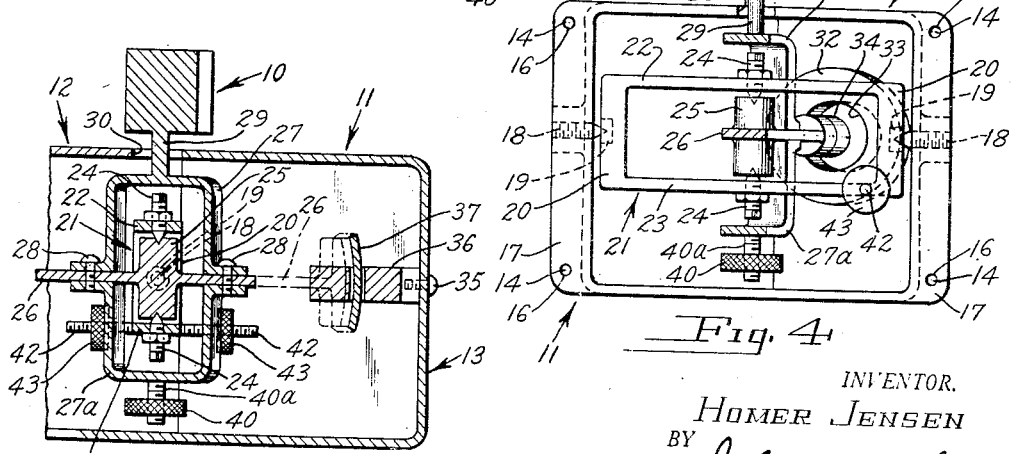
INVENTOR.
HOMER JENSEN
BY
John F. Hanrahan
ATTORNEY Patented Sept. 7, 1954

2,688,456

UNITED STATES PATENT OFFICE 2,688,456

STABILIZING SYSTEM

Homer Jensen, Philadelphia, Pa.

Application August 16, 1949, Serial No. 110,619

12 Claims. (Cl. 248—1)

This invention relates to new and useful improvements in stabilizing means and has particular relation to such a means adapted for the filtering out of high frequency angular motions of small amplitude while at the same time adapted for the passing or transmitting of low frequency angular motions of large amplitude.

An object of the invention is to provide a stabilizing structure including magnetic orienting means and an eddy-current damping means.

Another object is to provide a stabilizing structure wherein a statically balanced mass to be stabilized is supported by gimbal means providing right angularly related fulcrum points, an orienting magnet being provided for centering such gimbals on their fulcrum points and damping means being provided for damping movements of the gimbals on said fulcrum points.

Another object is to provide a means as in the immediately preceding object and wherein said damping means comprises non-magnetic, for example, an aluminum, dish-like electrically-conducting element located between the poles of a magnet and by its motions setting up damping eddying currents, said non-magnetic piece being curved in each direction (dimension) as though comprising a portion of a wall of a hollow sphere.

Another object is to provide a stabilizing structure wherein the mass to be stabilized will partake of translatory vibrations of the mount without converting such translatory vibrations into angular vibrations.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a view partly in top plan and partly in section, the section being as along the line 1—1 of Fig. 2;

Fig. 2 is a similar view taken as along the line 2—2 of Fig. 1;

Fig. 3 is a detail sectional view taken as along the line 3—3 of Fig. 1; and

Fig. 4 is a sectional view taken as along the line 4—4 of Fig. 1.

The stabilizer means of the present invention is conceived to be of general application and for the purpose of the disclosure only and not by way of limitation is shown as employed to stabilize a block-like element 10 which may comprise any means or mechanism and the stabilizing structure of the invention is herein shown as employed for the purpose of stabilizing the element 10 against small-amplitude-high frequency angular vibrations of the mounting framework although designed to permit of the transmission of low frequency angular motions from the mount to such element. The element 10 is mounted by or supported from gimbals supported by or in any suitable framework as, for example, within the housing 11 of the drawing. Purely for the purpose of illustration, such frame 11 is shown as comprising hollow sections 12 and 13 secured together as by screws or the like 14 passing through flanges 15 at the sides of the open end of the section 13 and threaded into holes 16 in thickened wall portions 17 at the sides of the open end of the section 12.

Through these thickened wall portions 17, mounting screws 18 are passed, such screws at their inner ends being pointed or cone-shaped. These screws are in alignment and their inner ends are received in any suitable bearings 19 in the end portions or walls 20 of an elongated rectangular frame or gimbal 21 whereby the latter is pivotally mounted, the screws 18 comprising fulcrums.

Passing through the upper and lower bars 22 and 23, respectively, of the gimbal 21 are screws 24 the inner opposed ends of which are also pointed or cone-shaped and engaged with a hublike portion 25 of a bar or arm 26. Clearly, the screws 24 provide a fulcrum for the bar 26 whereby the latter is adapted for pivotal movement on an axis at right angles to or normal to the axis on which the gimbal 21 is adapted for pivotal movement.

In the present disclosure, the object or means 10 is mounted rigid with the bar 26. To the desired end, an inverted U-shaped bracket 27 has the lower ends of its arms secured to the bar 26 as by rivets or screws 28. A similar bracket 27a on the opposite side of bar 26 supports a counter-weight 40, to balance object 10 in the gimbals. As shown, counter-weight 40 is adjustably mounted on a screw 40a. In any suitable manner, the bracket 27 carries the object 10 and as here shown, a rod or post 29 rigid with and symmetrically related to said bracket extends through an opening 30 in the top wall of the frame section 12, such opening being large as compared with the diameter of the post 29 so as not to interfere with movement of the latter. Fixed to the main frame 11 in any suitable manner and here shown as mounted on a thickened portion 31 thereof is a permanent magnet 32 in the form of a section of a hollow right cylinder. This magnet is permanently magnetized axially. That is, one circular face will uniformly have a certain polarity and the opposite circular face will uniformly have the opposite polarity, its lines of magnetic force being substantially parallel with the geometric axes of the cylinder. The axis of said magnet is located to pass through the intersection of the line through the screws 24 which is the inner gimbal axis and the line through the screws 18 which is the outer gimbal axis.

A permanent magnet 34 or a permanently magnetized bar magnet located in or near the above mentioned opening 33 of the cylindrical permanent magnet is attached to bar 26, which is also axial to the intersection of the gimbal axes. This bar magnet is axially polarized so that as it centers on the cylindrical magnet, like poles will be brought toward each other, resulting in repelling the bar magnet from the cylindrical magnet, so that it seeks a centered position. As the invention is better understood it will become clear that in lieu of the cylindrically shaped permanent magnet 32 a group of permanent bar magnets may be located in a circle whereby to center the permanent magnet 34.

With the disclosed structure it will be clear that the action of the magnets 32 and 34 on one another tends to maintain the magnet 34 centrally of the opening 33 of the magnet 32 and return such magnet 34 to the described position when it is moved therefrom. It is to be understood that the magnet 34 is rigid with the arm 26 and that the magnet 34 will only move about the opening 33 when the arm 26 turns on the axis represented by the pivot screws 24 or when such arm 26 turns with the gimbal 21 on the latter turning about the axis represented by the screws 18.

Also fixed to the frame 11 as by means of screws 35 is a second permanent magnet 36. Fixed to the bar 26 so as to be located between and movable between the poles of the magnet 36 is a non-magnetic electrically conducting element 37. This element 37 preferably is of aluminum or copper and is formed of a piece of relatively thin stock and is somewhat in the shape of a dish or plate. It is concavo-convex, and of the same shape as if it had been cut from the walls of a hollow sphere. As shown, the element is secured to the bar 26 by screws 38 in such a manner that the center of the sphere from which the plate is theoretically cut will lie at the intersection of the gimbal axes. Since the center of gravity of the inner gimballed unit (bar 26 and all objects rigidly attached to it) must lie in the line of the supporting fulcrums 24, a counter-weight 39 of appropriate mass must be fastened to bar 26 in such a position as to permit adjustment to bring the center of gravity to the required position. For the purpose of this adjustment, counter-weight 39 is threaded on a screw 39a fixed to element 26.

An additional adjustable counter-weight 41 of appropriate mass, in the form of a nut turning on a screw 38a, completes the adjustments required to bring the inner gimballed mass into static balance. The combination of magnet 36 and conducting element 37 constitutes an eddy-current damping system which is effective in damping angular motions of the plate in regard to the magnet around either or both of the gimbal axes. The nature of this eddy-current damping is to impose a simulation of "fluid-friction," in which the force tending to oppose the relative motion of the disk and the magnet is proportional to the relative velocity of the two elements. The combination of magnet 34, dish 37 and counter-weights 39 and 41 achieves a condition of high moment and low mass which aids in the successful operation of the present system.

To complete the necessary adjustments to secure the required condition of static balance of the whole gimballed mass, a non-magnetic screw 42 is attached to the lower element of the gimbal frame 23, as shown, and on this screw are two appropriately sized nuts 43 whose position may be changed by turning on screw 42. By proper adjustment of all the described adjusting masses, it will be possible to achieve static balance, i. e., there will be no tendency for the mass, or any part of it, to rotate on the gimbals, no matter in what position it is placed.

Assuming that the frame 11 is supported by some other object or objects subject to vibrations, such as a pair of human hands, these vibrations will be transmitted in some degree to frame 11. Now, since the gimballed mass within frame 11 has been adjusted to be statically balanced, the translatory vibrations of frame 11 will be transmitted undiminished to all suspended parts of the unit, including means 10, but these translatory motions will not result in angular motions of the members. However, angular oscillations of frame 11 can be transmitted only in slight degree to means 10, for only the frictional forces in the bearings can be exercising turning moments on the suspended mass and its moving parts, and these forces are small in comparison with the high moment achieved in the design of the suspended section.

If the angular motions of frame 11 are slow or of large amplitude, then the centering magnet 34 will be sufficiently displaced about magnet 32 so that strong restoring forces will result, causing the suspended and outer parts of the device to seek their restoration of their original position of rest in regard to each other. If there were no damping system incorporated, after a transient motion of the outer frame, the inner gimballed mass would oscillate on a decreasing exponential curve until the potential energy represented by the force of magnets 32 and 34 on each other in their displaced position was dissipated by the friction of the bearings. Through the damping system, this energy is dissipated smoothly and quickly and the return of the magnet 34 to its neutral position is achieved smoothly and without continued oscillation of the means 10 and its associated gimballed mass. The motions possible with the device permit its use in such things as "pointing" devices, in which the means 10 will seek a certain position of rest in regard to frame 11, without partaking of any small angular motions that frame 11 may undergo in seeking its rest position.

While the magnets 32 and 36 are herein specifically disclosed as permanent magnets, it will be appreciated that their operational effects could be produced by the use of electro-magnets. Thus, while for a portable device, the use of permanent magnets seemed indicated, it is to be understood that, unless so specified in the claims, the invention is not limited to the employment of permanent magnets at the places indicated or for the purpose disclosed.

It will also be understood that for some purposes a single gimbal structure could be employed, the outer gimbal 21 being omitted in such a construction. Then there would be but one axis of rotation, represented in the drawing by the axes of the pivoting or fulcruming screws 24. In such instance, the present system is used or designed to filter only the rotations about the single given axis.

Having thus set forth the nature of my invention, what I claim is:

1. In a stabilizing apparatus, a frame, gimbal means mounted on said frame for pivotal movement relative thereto, a mass of high relative inertial moment attached to said gimbal means and movable relatively to said frame, orienting means constraining movements of said inertial mass relative to said frame, said means comprising a permanent bar magnet rigid with said inertial mass, magnetic means rigid with said frame and associated with said bar magnet and developing therewith an increasing restoring torque on said bar magnet as the latter moves from centered relation with said magnetic means, and damping means to constrain motions of said gimbal means relative to said frame comprising a first part carried by said inertial mass and a second part carried by said frame.

2. In a stabilizing apparatus, a frame, gimbal means mounted on said frame for pivotal movement relative thereto, a mass of high relative inertial moment attached to said gimbal means, orienting means constraining movements of said inertial mass relative to said frame, said means comprising a permanent bar magnet rigid with said inertial mass, and magnet means of circular ring conformation rigid with said frame and associated with said bar magnet and developing therewith an increasing restoring torque on said bar magnet as the latter moves from centered relation with said magnet means.

3. In a stabilizing apparatus, a frame, gimbal means mounted on said frame for pivotal movement relative thereto, a mass of high relative inertial moment attached to said gimbal means, orienting means constraining movements of said inertial mass relative to said frame, said means comprising a permanent bar magnet rigid with said inertial mass, magnet means of circular ring conformation rigid with said frame and associated with said bar magnet and developing therewith an increasing restoring torque on said bar magnet as the latter moves from centered relation with said cylindrical magnet, and damping means to constrain motions of said gimbal means relative to said frame comprising a first part carried by said inertial mass and a second part carried by said frame.

4. In a stabilizing apparatus, a frame, a first gimbal pivotally mounted on said frame, a second gimbal pivotally mounted on the first gimbal, the pivoting axes of said gimbals being normal to one another, orienting means constraining the movements of said gimbals on their pivotal mountings, said means comprising a permanent bar magnet rigid with said second gimbal, and magnetic means rigid with said frame and associated with said bar magnet and developing therewith an increasing restoring torque on said bar magnet as the latter moves from centered relation with said magnetic means.

5. In a stabilizing apparatus, a frame, a first gimbal pivotally mounted on said frame, a second gimbal pivotally mounted on the first gimbal, the pivoting axes of said gimbals being normal to one another, orienting means constraining the movements of said gimbals on their pivotal mountings, said means comprising a permanent bar magnet rigid with said second gimbal, and a cylindrical magnet rigid with said frame and associated with said bar magnet and developing therewith an increasing restoring torque on said bar magnet as the latter moves from centered relation with said cylindrical magnet.

6. In a stabilizing apparatus, a frame, a first gimbal pivotally mounted on said frame, a second gimbal pivotally mounted on the first gimbal, the pivoting axes of said gimbals being substantially at right angles to one another, orienting means constraining the movements of said gimbals on their pivotal axes, said means comprising a permanent bar magnet rigid with said second gimbal, magnetic means rigid with said frame and associated with said bar magnet and developing therewith an increasing restoring torque on said bar magnet as the latter moves from the centered relation with said magnetic means, and damping means constantly acting on said second gimbal and comprising a first part attached to said second gimbal and a second part attached to said frame.

7. In a stabilizing apparatus, a frame, an outer gimbal pivoted to the frame, an inner gimbal pivoted to the outer gimbal, a mass of high ratio of inertial moment to mass rigidly attached to said inner gimbal, orienting means consisting of magnet means of circular ring conformation rigid with said frame, and a magnet attached to said mass and arranged to act repulsively against said magnet means.

8. The invention as defined in claim 7 further characterized by "eddy current" damping means co-acting between said mass and said frame.

9. The invention as defined in claim 7 further characterized by damping means which imposes a simulation of fluid friction co-acting between said mass and said frame.

10. The invention as defined in claim 7 further characterized by damping means consisting of a magnet attached rigidly to said frame and an electrical conducting means rigidly attached to the inertial mass and movable within the magnetic field of said magnet.

11. The invention as defined in claim 7 further characterized by damping means comprising a first part rigidly attached to the inner gimbal and a second part rigidly attached to said frame.

12. In a stabilizing apparatus, a frame, gimbal means mounted on said frame for pivotal movement relative thereto, a mass of high relative inertial moment attached to said gimbal means and movable relatively to said frame, orienting means constraining movements of said inertial mass relative to said frame, said means comprising a magnet rigid with said inertial mass, and magnetic means rigid with said frame and associated with said first magnet arranged in adjacent relationship of like poles to repulse each other and developing thereby an increasing restoring torque on said first magnet as the latter moves from centered relation with said magnetic means.

References Cited in the file of this patent

UNITED STATES PATENTS

| Number | Name | Date |
| --- | --- | --- |
| 2,109,953 | Bates | Mar. 1, 1938 |
| 2,274,443 | Fischer | Feb. 24, 1942 |
| 2,293,039 | Esval | Aug. 18, 1942 |
| 2,401,160 | Jewell | May 28, 1946 |
| 2,401,337 | Curry, Jr. | June 4, 1946 |
| 2,412,204 | Carter et al. | Dec. 10, 1946 |
| 2,412,453 | Grimshaw | Dec. 10, 1946 |

FOREIGN PATENTS

| Number | Country | Date |
| --- | --- | --- |
| 240,369 | Germany | Nov. 2, 1911 |
| 9,737 | Great Britain | Oct. 26, 1911 |